United States Patent [19]

Matsui

[11] Patent Number: 4,568,047

[45] Date of Patent: Feb. 4, 1986

[54] CORD BUSHING

[75] Inventor: Kazuhiro Matsui, Toyoake, Japan

[73] Assignee: Kitagawa Industries Co., Ltd., Nagoya, Japan

[21] Appl. No.: 641,197

[22] Filed: Aug. 16, 1984

[30] Foreign Application Priority Data

Sep. 16, 1983 [JP] Japan .................. 58-143996

[51] Int. Cl.[4] .............................. F16L 5/00
[52] U.S. Cl. .................. 248/56; 174/153 G
[58] Field of Search .......... 248/56; 174/153 G, 65 G, 174/152 G; 16/2; 285/162; 339/103 B; 403/197

[56] References Cited

U.S. PATENT DOCUMENTS

| 2,724,736 | 11/1955 | Klumpp | 339/103 B X |
|---|---|---|---|
| 3,424,856 | 1/1969 | Coldren | 174/153 G |
| 3,493,205 | 2/1970 | Bromberg | 16/2 X |
| 3,542,980 | 11/1970 | Hamilton | 403/197 X |
| 3,958,300 | 5/1976 | Tanaka | 16/2 |
| 4,000,875 | 1/1977 | Jemison | 174/153 G X |
| 4,095,765 | 6/1978 | Aimar | 339/103 B X |
| 4,117,998 | 10/1978 | Notoya | 174/153 G X |
| 4,125,238 | 11/1978 | Tanaka | 339/103 B X |
| 4,190,222 | 2/1980 | Appleton | 248/56 |
| 4,310,213 | 1/1982 | Fetterolf | 339/103 M |

FOREIGN PATENT DOCUMENTS

| 994,443 | 8/1976 | Canada | 174/153 G |
|---|---|---|---|
| 1227496 | 4/1971 | United Kingdom . | |
| 1442169 | 7/1976 | United Kingdom | 339/103 B |
| 1506732 | 4/1978 | United Kingdom . | |
| 1571344 | 7/1980 | United Kingdom . | |
| 1595849 | 8/1981 | United Kingdom . | |

Primary Examiner—J. Franklin Foss
Attorney, Agent, or Firm—Oblon, Fisher, Spivak, McClelland & Maier

[57] ABSTRACT

A cord bushing including a bushing body, the bushing body having a head portion permitting insertion therethrough of a cord, a trunk portion contiguous to the head portion and having an uneven inner surface, and a cord protecting portion contiguous to the trunk portion for protecting the cord inserted therethrough, the head portion having a fitting notched portion formed therein, and the cord protecting portion comprising plural rings each having a cord insertion hole and interconnected by flexible connections; a cord holding member capable of being engaged with and disengaged from the fitting notched part of the head portion and having an uneven inner surface which can hold the inserted cord in corporation with an uneven inner surface of the head portion; and expansible elastic retaining portions formed integrally with the head portion by notching part of the head portion in the vicinity of the said fitting notched part, the portion except the base end of each of the elastic retaining portions being cut away for displacement by a notch extending through the wall of the head portion. Such a construction permits easy and positive mounting of the cord bushing to a panel, a chassis or the like regardless of variation of the cord diameter. Besides, since the diameter of the panel mounting portion of the bushing body is constant independently of the cord diameter, the tolerance in manufacture for the diameter of a fixing hole formed in a panel or the like can be taken large, which leads to reduction of the cost.

16 Claims, 8 Drawing Figures

CORD BUSHING

BACKGROUND OF THE INVENTION (1) Field of Art

The present invention relates to a cord bushing capable of being retained to a stationary member such as a panel or a chassis and holding a cord inserted therethrough. Particularly, it is concerned with a cord bushing in which a cord holding member for holding a cord inserted therethrough and a retaining portion capable of retaining the cord bushing to a stationary member are provided separately.

(2) Prior Art

Conventional cord bushings are generally of such a construction as shown in FIG. 1, in which a cord 4 inserted through a bushing body 2 is pressed and bent by an uneven inner surface of a holding piece 6 fitted to the bushing body 2 and thereby held in place, and at the same time a fixing hole formed in a stationary member such as a panel 10 or the like is engaged for mounting with an engaging groove 8 formed in the outer peripheries of the bushing body 2 and the holding piece 6.

In conventional bushing of this type, however, since the holding piece is charged with both the function of holding a cord and the function of mounting the bushing to a panel or the like, the holding piece is subject to displacement in a radial direction of the bushing body according to cord diameters. Consequently, when the cord diameter is smaller even a little than a predetermined value, the engagement between the retaining groove and the panel is not sufficient, so the bushing is easily disengaged from the panel, while when the cord diameter is larger even slightly than the predetermined value, the holding piece cannot be fitted in a fixing hole formed in the panel. On the other hand, when the fixing hole of the panel or the like is larger even a little than the engaging groove formed on the bushing body and the holding piece, the bushing itself is easily disengaged from the panel or the like.

SUMMARY OF THE INVENTION

The present invention has been effected in view of the above-mentioned circumstances, and it is an object thereof to provide a cord bushing capable of being mounted to a stationary member independently of the cord diameter.

It is another object of the present invention provide a cord bushing capable of being attached to and detached from a stationary member easily and securely independently of the cord diameter and permitting a large tolerance of the diameter of a fixing hole formed in the stationary member.

It is a further object of the present invention to provide a cord bushing useful in reducing the mounting cost.

It is still a further object of the present invention to provide a cord bushing capable of holding a cord inserted therethrough and permitting easy wiring, inspection and repair of the cord after mounting a cord bushing body to a stationary member.

The gist of the present invention which has been effected for attaining the above-mentioned objects resides in a cord bushing including a bushing body, the bushing body having a head portion permitting insertion therethrough of a cord and having an uneven inner surface, a trunk portion contiguous to the head portion, and a cord protecting portion contiguous to the trunk portion for protecting the cord inserted therethrough, the head portion having a fitting notched part formed therein, and the cord protecting portion comprising plural rings each having a cord insertion hole and interconnected by flexible connections; a cord holding member capable of being attached to and detached from the fitting notched part of the head portion and having an uneven inner surface which can hold the inserted cord in cooperation with the uneven inner surface of the head portion; and expansible elastic retaining portions formed integrally with the head portion by notching part of the head portion in the vicinity of the said fitting notched part, the portion except the base end of each of the elastic retaining portions being cut away for displacement by a notch extending through the wall of the head portion.

DESCRIPTION OF PREFERRED EMBODIMENTS

Embodiments of the present invention will be described in detail hereinunder with reference to the drawings which are on an enlarged scale.

Figure 1:
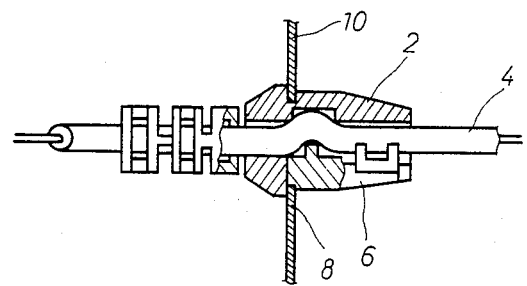
FIG. 1 is a sectional view of a conventional cord bushing.
Figure 2:
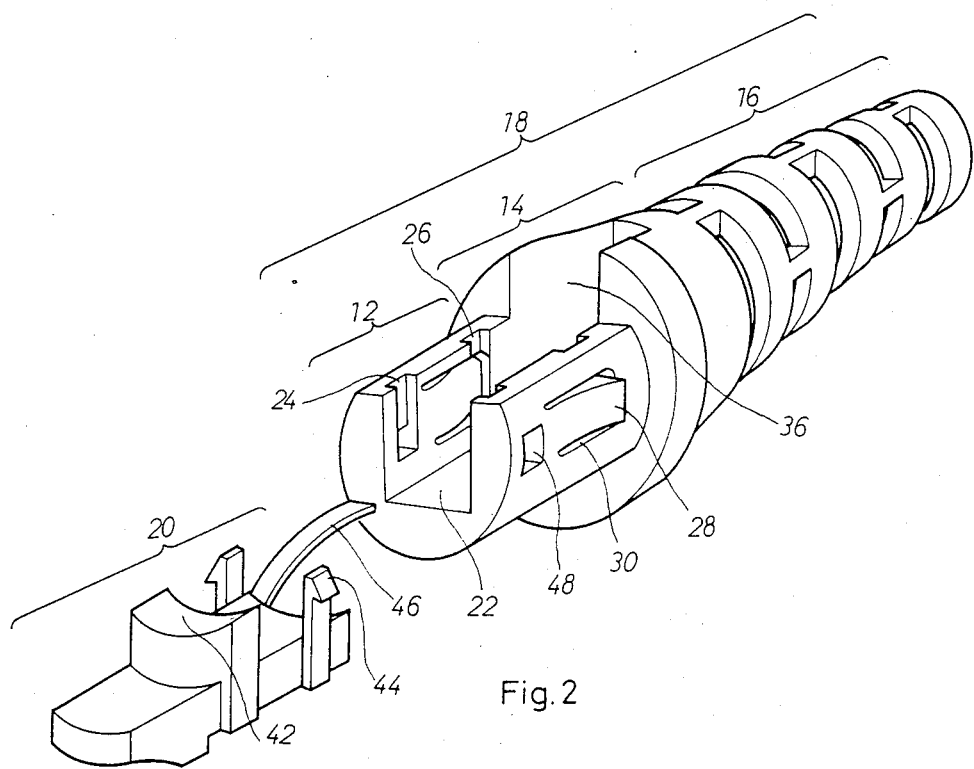
FIG. 2 is a perspective view of a cord bushing according to an embodiment of the present invention, the cord holding member 20 being shown rotated by 180° about two axes from its orientation when received in the bushing body 18.

A cord bushing according to an embodiment of the invention is integrally formed of a synthetic resin and comprises a bushing body 18 and a cord holding member 20, the bushing body 18 having a head portion 12, a trunk portion 14 and a cord protecting portion 16, as shown in FIG. 2.

Figure 3:
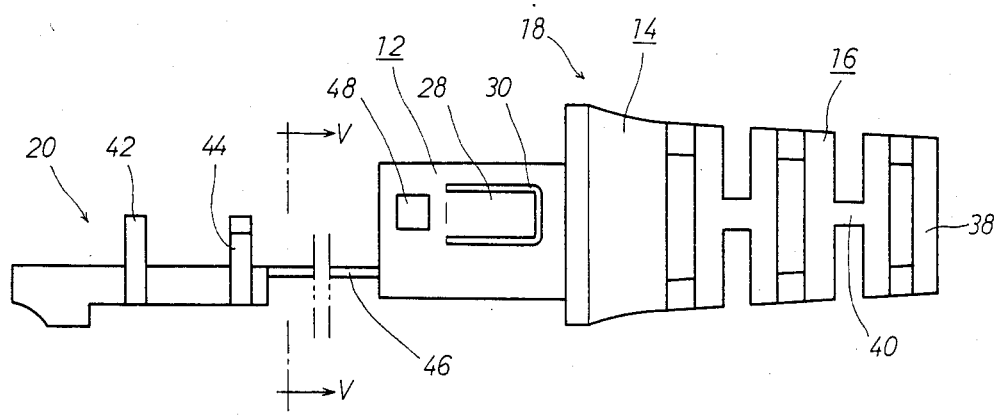
FIG. 3 is a front view thereof.
Figure 4:
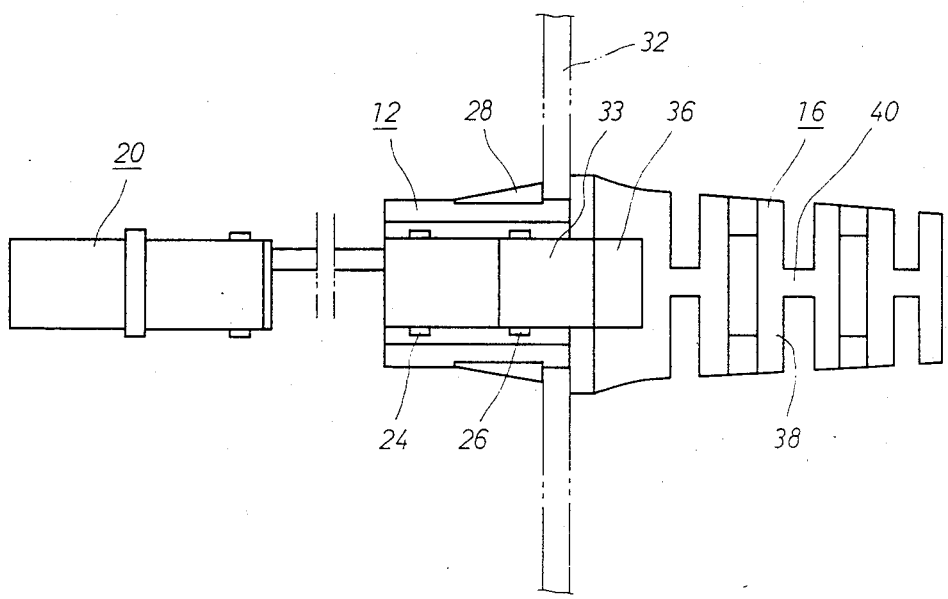
FIG. 4 is a plan view thereof.

The head portion 12 is projecting on one side of the trunk portion 14, and as shown in FIGS. 2 to 5, a fitting slot 22 as a fitting notched part is formed therein, and retaining slots 24 and 26 are formed in both side walls thereof, and the bottom of the fitting slot 22 is formed rectilinearly when the device is viewed from axial direction; further, a pair of elastic retaining portions 28 capable of expanding outwards by virtue of their own elasticity are formed integrally with the head portion 12. More specifically, the elastic retaining portions 28 are integral with the head portion 12 at its base end part, while the portion except the base end part thereof is cut away by a notch 30 extending from the outer surface of the head portion 12 to the wall surface of the fitting slot 22, whereby the elastic retaining portions 28 are made displaceable and given elasticity sufficient to expand outwards. As shown in FIG. 4, upon insertion of the head portion 12 in a fixing hole of a panel 32 as a stationary member, the elastic retaining portions 28 are pressed inwards by the peripheral wall of the fixing hole, but expand after the insertion, whereby the panel 32 can be fixed between end faces of the elastic retaining portions 28 and an end face of the trunk portion 14. Further, as shown in FIG. 6, a recess 33 is formed in the bottom of the fitting slot 22 and thus there is formed an uneven inner surface in the slot 22.

Figure 6:
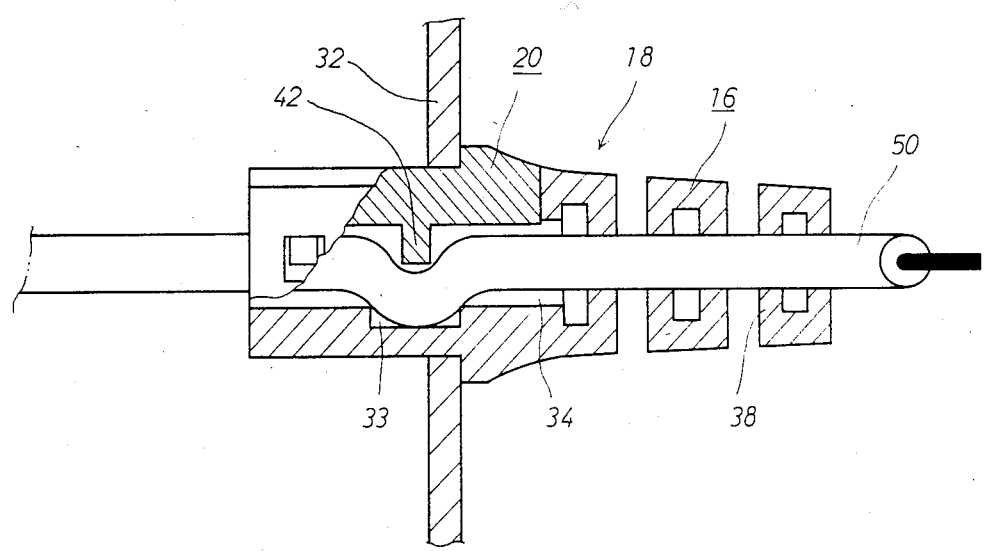
FIG. 6 is a sectional view showing a state of use of the cord bushing.

The trunk portion 14, from one end of which is projecting the head portion 12 as previously noted, is provided centrally with a cord insertion hole 34 as shown in FIG. 6, and also provided on an upper side thereof with a notched part 36 communicating with the fitting slot 22. At the opposite end of the trunk portion 14 there is formed the cord protecting portion 16. The cord protecting portion 16 comprises plural rings 38 each having a centrally-formed cord insertion hole which rings are interconnected by flexible connections 40. Between adjacent rings 38 the flexible connections 40 are disposed in directions orthogonal to each other when looking form the axial direction of the bushing body 18. The bushing body 18 is thus constructed.

On the other hand, as shown in FIGS. 2 to 4, the cord holding member 20 has a predetermined certain width capable of fitting in the slot 22 of the head portion 12 and also in the trunk portion 14. It has a cord pressing portion 42 projecting inside its intermediate portion and a pair of retaining projections 44 formed on both sides near an end portion thereof. The cord holding member 20 is connected to the bushing body 18 through a thin-walled connecting piece 46 having flexibility. Both sides of the cord pressing portion 42 are somewhat projecting from the side faces of the cord holding member 20 as shown in FIG. 2 so as to be engageable in the retaining slots 26. The retaining projections 44 are also engageable in the retaining 24. Through holes 48 are formed in both side portions of the fitting slot 22 of the head portion 12, and hook-like retaining portions formed at the fore ends of the retaining projections 44 are adapted to engage end portions of the through holes 48 to thereby mount the cord holding member 20 to the bushing body 18. The said hook-like retaining portions are disengaged from the through holes 48 by being pushed from the outside of the holes with some sharp-pointed piece, whereby the cord holding member 20 becomes removable. Thus, the cord holding member 20 is engageable with and disengageable from the bushing body 18. The elastic retaining portions 28 are formed so as not to interfere with the cord pressing portion 42 when they are pushed in.

After insertion of a cord 50 as shown in FIG. 6 and subsequent mounting of the cord holding member 20 to the bushing body 18, the cord bushing constructed as above is mounted to the panel 32 by being inserted through the fixing hole of the panel 32. The cord 50 is bent by the recess 33 and the cord pressing portion 42 and thereby given a resistance to tension imposed thereon, whereby the cord 50 is prevented from disengagement. The state of engagement of the panel 32 with the bushing body 18 is as shown in FIG. 4. By pushing in the elastic retaining portions 28 with fingers or the like, the cord bushing can be easily removed from the panel 32. In pushing in the eleastic retaining portions 28, since the cord holding member 20 and the elastic retaining portions 28 for mounting the cord bushing to the panel are separate from each other, the mounting of the cord bushing to the panel 32 is easy and firm regardless of variation of the cord diameter. Besides, the diameter of the panel mounting portion of the bushing body 18 is constant not depending on the cord diameter, so there does not occur such inconvenience as encountered in the prior art in which a variation in diameter of the panel mounting portion of the bushing causes the bushing to be incapable of being fitted in the fixing hole of the panel or to be fitted therein too loosely. Consequently, the tolerance for the fixing hole diameter of the panel can be taken large, thus leading to reduction of the cost and improvement of the mounting work efficiency.

Figure 5:
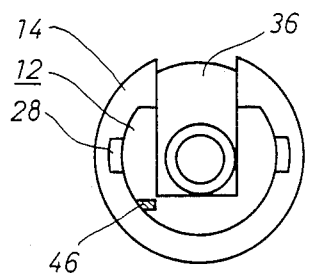
FIG. 5 is a view taken on line V—V of FIG. 3.

The bottom of the fitting slot 22 may be formed arcuately, not rectilinearly as shown in FIG. 5, when viewed in the axial direction.

Figure 7:
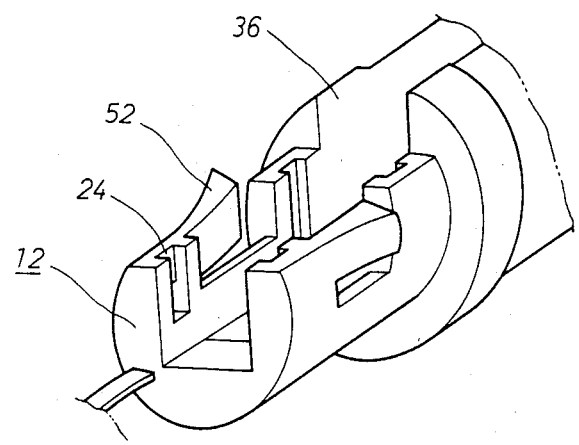
FIG. 7 is a partial perspective view showing another example of a head portion applicable to the cord bushing.

In place of the elastic retaining portions 28 integral with the head portion 12 described in the above embodiment, there may be adopted such elastic retaining portions 52 as shown in FIG. 7 in which the retaining portions 52 are open outwards at one sides thereof. The other portions are the same as in the above embodiment as indicated by the same reference numerals.

Figure 8:
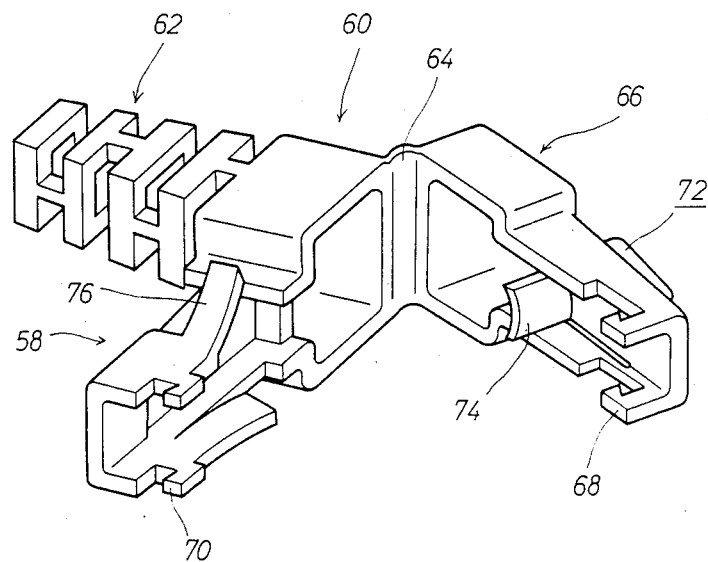
FIG. 8 is a perspective view of a cord bushing according to another embodiment of the present invention.

Referring now to FIG. 8, there is illustrated a cord bushing according to another embodiment of the present invention, in which a head portion 58, a trunk portion 60 and a cord protecting portion 62 are square, and the cord protecting portion 62 is orthogonal to the trunk portion 60. Further, a cord holding portion 66 is contiguous to the trunk portion 60 through a flexible thin-walled portion 64 so that retaining portions 68 formed at the fore end are engageable with retaining portions 70 of the head portion 58. The cord holding member 66 is formed with an elastically deformable pressing piece 72 which is cut away except its base end portion, while the fore end portion thereof is bent perpendicularly to form a cord pressing portion 74. The other portions are constructed almost the same as in the previous embodiment. A panel is fixed between elastic retaining portions 76 and end faces of the trunk portion 60 and cord holding member 66. The panel has a square fixing hole.

Embodiment of the present invention have been described above, but it is to be understood that the invention is not limited thereto and that various modifications may be made within the scope not departing from the gist of the invention.

According to the present invention, as set forth hereinabove, since the elastic retaining portions capable of engaging a stationary member such as a panel or a chassis are formed integrally with the bushing body and the cord holding member is separate from the bushing body, the mounting of the cord bushing to a panel, a chassis or the like is easy and firm regardless of variation of the cord diameter. Further, since the diameter of the panel mounting portion of the bushing body is constant independently of the cord diameter, the tolerance in manufacture for the diameter of a fixing hole formed in a panel or the like can be taken large, which leads to reduction of the cost.

What is claimed is:
1. A cord bushing comprising:
(a) a bushing body comprising a head portion having a first end, a second end, a peripheral surface, and a fitting slot extending from said first end to said second end, said fitting slot being open to said peripheral surface, and a trunk portion having a first end, a second end, a peripheral surface, and a notched part extending from said first end at least part way toward said second end, said notched part being open to said peripheral surface, said second end of said head portion being integrally joined to said first end of said trunk portion, said first end of said trunk portion being larger than said head portion such that said first end of said trunk portion extends outwardly beyond said head portion to define an abutment surface which, in use, abuts against a panel and prevents said trunk portion from passing through an aperture in the panel in a first direction, said head portion having at least two elastic retaining portions which, in their rest positions, extend yieldably outwardly from said peripheral surface, said at least two elastic retaining portions ending in abutment surfaces which, in use, normally abut against the panel and prevent said head portion from passing through the aperture in the panel in a second direction, opposite to the first direction, said elastic retaining portions having camming surfaces, which during insertion of the cord bushing into the panel, bear against the aperture, causing said elastic retaining portions to be cammed inwardly, allowing said head portion to pass through the aperture in the first direction, said fitting slot and said notched portion communicating with one another, said fitting slot having a bottom and two side surfaces, each of said side surfaces having a first retaining slot near said first end of said head portion and a second retaining slot near said second end of said head portion, and said head portion having a through hole extending from said peripheral surface to one of said retaining slots in each of said side surfaces, and (b) a cord holding member sized and shaped to be received in said fitting slot and in said notched part, said cord holding member having a bottom and two side surfaces, each of said side surfaces having a first retaining projection sized, shaped, and positioned to be received in one of said retaining slots in said side surfaces of said fitting slot and a second retaining projection sized, shaped, and positioned to be received in the other one of said retaining slots in said side surfaces of said fitting slot, two of said retaining projections having integral retaining heads which are sized, shaped, and positioned to be received in through holes in said head portion, said retaining heads having abutment surfaces which, in use, engage corresponding walls of said through holes and normally prevent withdrawal of said cord holding member from said fitting slot, said two of said retaining projections having integral retaining heads being resiliently biased towards movement into said through holes but being movable out of said through hole by a force exerted through said through holes, the bottom of said cord holding member and the bottom of said fitting slot and said notched part being sized and shaped to grip a cord therebetween when said retaining heads are received in said through holes.

2. A cord bushing as recited in claim 1 wherein said through holes communicate with said first retaining slots.

3. A cord bushing as recited in claim 1 wherein said bottom of said cord holding member and the bottom of said fitting slot and said notched part are sized and shaped to grip a cord therebetween by means of a cord pressing portion extending from the bottom of said cord holding member toward the bottom of said fitting slot and a corresponding recess in the bottom of said fitting slot, whereby, in use, the cord is bent and forced into said recess by said cord pressing portion.

4. A cord bushing as recited in claim 1 and further comprising means resiliently biasing said cord holding member away from said bushing body and biasing said retaining heads against the walls of said through holes when said retaining heads are received in said through holes.

5. A cord bushing as recited in claim 4 wherein said means comprise a resilient projection integrally joined to said cord holding member and bearing against said bushing body.

6. A cord bushing as recited in claim 1 wherein said bushing body further comprises a cord protecting portion integrally joined to said second end of said trunk portion, said cord protecting portion comprising a plurality of rings each provided centrally with a cord insertion hole and interconnected by flexible connections.

7. A cord bushing according to claim 6, wherein said flexible connections (40) which interconnect said plural rings (38) constituting said cord protecting portion (16) and each provided centrally with a cord insertion hole are disposed between adjacent rings (38) in directions orthogonal to each other when viewed in the axial direction of said bushing body (18).

8. A cord bushing as recited in claim 6 wherein:
(a) said head portion is square;
(b) said trunk portion is square;
(c) said cord protecting portion is square and orthogonal to said trunk portion,
and further comprising a square cord holding member which is contiguous to said trunk portion and connected thereto by a flexible thin-walled portion, said cord holding portion being provided at one end with retaining portions which are engagable with corresponding retaining portions on said head portion.

9. A cord bushing as recited in claim 1 wherein said bushing body is integrally formed of a synthetic resin.

10. A cord bushing as recited in claim 1 wherein said cording holding member is integrally formed of a synthetic resin.

11. A cord bushing as recited in claim 1 wherein said bottom of said fitting slot is flat.

12. A cord bushing as recited in claim 1 wherein said bottom of said fitting slot is arcuate.

13. A cord bushing as recited in claim 1 wherein said cord holding member is connected to said bushing body by a thin-walled connecting piece.

14. A cord bushing as recited in claim 1 wherein said elastic retaining portions are open outwardly at one lateral side thereof.

15. A cord bushing according to claim 14, wherein said cord holding member (66) is formed with an elastically deformable pressing piece (72) which is cut away except its base end portion, while the fore end portion thereof is bent perpendicularly to form a cord pressing portion (74).

16. A cord bushing according to claim 15, wherein the panel is fixed between elastic retaining portions (76) and end faces of said trunk portion (60) and of said cord holding member (66).

* * * * *